(12) United States Patent
Udou et al.

(10) Patent No.: US 6,721,627 B2
(45) Date of Patent: Apr. 13, 2004

(54) TRACK CONVEYANCE SYSTEM

(75) Inventors: Syoji Udou, Kikuchi-gun (JP); Hirofumi Ohtsuka, Itami (JP)

(73) Assignees: Mitsubishi Denki Kabushiki Kaisha, Tokyo (JP); Ryoden Semiconductor System Engineering Corporation, Itami (JP)

( * ) Notice: Subject to any disclaimer, the term of this patent is extended or adjusted under 35 U.S.C. 154(b) by 0 days.

(21) Appl. No.: 10/224,498

(22) Filed: Aug. 21, 2002

(65) Prior Publication Data

US 2003/0149509 A1 Aug. 7, 2003

(30) Foreign Application Priority Data

Feb. 6, 2002 (JP) ........................... 2002-029495

(51) Int. Cl.⁷ ................................. G06F 7/00
(52) U.S. Cl. ............... 700/228; 700/230; 104/88.01; 104/88.02; 104/88.03; 198/370.01; 198/465.1; 198/465.2
(58) Field of Search ................... 700/213, 214, 700/228, 230; 104/88.01, 88.02, 88.03, 96, 27; 198/357, 370.01, 465.1, 465.2, 341.01, 341.08, 346.1, 347.1

(56) References Cited

U.S. PATENT DOCUMENTS

| | | | | |
|---|---|---|---|---|
| 3,889,797 A | * | 6/1975 | Naito et al. ............. | 198/346.1 |
| 3,929,076 A | * | 12/1975 | McRae et al. ............. | 104/25 |
| 4,053,741 A | * | 10/1977 | Ainoya et al. ............. | 700/113 |
| 4,265,178 A | * | 5/1981 | Veith ....................... | 104/88.01 |
| 4,634,332 A | * | 1/1987 | Kamide et al. ............. | 414/273 |
| 5,267,173 A | * | 11/1993 | Tanizawa et al. ........... | 700/229 |
| 5,335,601 A | * | 8/1994 | Matsumoto et al. ...... | 104/88.01 |
| 5,551,348 A | * | 9/1996 | Matsumoto ............... | 104/88.02 |
| 5,864,485 A | * | 1/1999 | Hawthorne et al. ........ | 700/229 |
| 5,867,388 A | * | 2/1999 | Okumura et al. .......... | 700/112 |

FOREIGN PATENT DOCUMENTS

| | | |
|---|---|---|
| JP | 59-180610 | 10/1984 |
| JP | 11-29205 | 2/1999 |
| JP | 2000-353015 | 12/2000 |

* cited by examiner

*Primary Examiner*—Khoi H. Tran
(74) *Attorney, Agent, or Firm*—Leydig, Voit & Mayer, Ltd.

(57) ABSTRACT

A conveyance system which performs conveying action operating carrier vehicles, including a loop track, carrier vehicles which run on the track, a station where each carrier vehicle performs loading and unloading of a cargo, and a standby station for storing the carrier vehicles in a standby state. The number of the carrier vehicles to be used is determined from a conveyance command number, and can be automatically determined in correspondence with the load in the conveyance system. Accordingly, even if the load is not uniform but significantly varied, the conveying action can be conducted readily and efficiently.

6 Claims, 13 Drawing Sheets

| No. | Dispatch Station | Destination Station | Number of Carrier Vehicle | Status of Conveyance |
|---|---|---|---|---|
| 1 | station 3a | station 3d | No. 1 car | under conveyance |
| 2 | station 3b | station 3c | No. 5 car | under unloading |
| 3 | station 3f | station 3b | No. 2 car | under conveyance |
| 4 | station 3e | station 3c | No. 8 car | under loading |
| 5 | station 3c | station 3f | No. 4 car | under allocation |
| 6 | station 3a | station 3b | | |

| Conveyance Command Number n | Optimum Number $N_1$ of Carrier Vehicle |
|---|---|
| 1～5 | 7 |
| 6～10 | 12 |
| 11～15 | 17 |
| 16～20 | 22 |
| 21～25 | 25 |
| 26～30 | 25 |
| 31～35 | 25 |
| 36～40 | 25 |

FIG. 6

| Number of Carrier Vehicle | Mileage | Status of Carrier Vehicle | Current Location of Carrier Vehicle | Maintenance Interval |
|---|---|---|---|---|
| No.1 car | 5412 | in-action and occupied state | CP5 | 30000 |
| No.2 car | 21453 | in-action and occupied state | CP10 | 30000 |
| No.3 car | 30000 | under maintenance | station 5 | 30000 |
| No.4 car | 12002 | in-action and reserved state | CP8 | 30000 |
| No.5 car | 21475 | in-action and occupied state | station 3c | 30000 |
| No.6 car | 9863 | under standby state | station 4e | 30000 |
| No.7 car | 178812 | in-action and free state | CP2 | 30000 |
| No.8 car | 27541 | in-action and occupied state | station 3e | 30000 |

26

| From | To | Mileage |
|---|---|---|
| C P 1 | C P 2 | 6 |
| C P 2 | C P 3 | 2 |
| C P 3 | C P 4 | 7 |
| C P 4 | C P 5 | 7 |
| C P 5 | C P 6 | 8 |
| C P 6 | C P 7 | 1 2 |
| C P 7 | C P 8 | 2 |
| C P 8 | C P 9 | 6 |
| C P 9 | C P 1 0 | 8 |
| C P 1 0 | C P 1 1 | 5 |
| C P 1 1 | C P 1 2 | 9 |
| C P 1 2 | C P 1 | 3 |

| Priority Type | |
|---|---|
| Standby Priority Type | 1 |
| Action Priority Type | 2 |

| Priority Type | Contens |
|---|---|
| 1 | A priority is given to a minimum mileage carrier vehicle. |
| 2 | A priority is given to a maxmum mileage carrier vehicle. |
| 3 | A priority is given to a carrier vehicle located nearest to the destination station. |

TRACK CONVEYANCE SYSTEM

BACKGROUND OF THE INVENTION

The present invention relates to a conveyance system for conveying cargoes in a plant or warehouse and particularly to a conveyance system in which carrier vehicles run along a track(s) provided on the floor or the ceiling for conveying cargoes.

A conventional conveyance system in which a plurality of carrier vehicles run on a track(s) for conveying cargoes is disclosed in Japanese Unexamined Patent Publication No. 2000-353015 (referred to as Prior Art 1 hereinafter). The conventional conveyance system of Prior Art 1 will be explained referring to FIG. 13.

The carrier vehicles 106 (106a, 106b, 106c, . . . ) run on a track 102 provided on the floor or the ceiling to convey cargoes to and from warehouses 101 (101a, 101b, 101c, . . . ). There are stations 103 (103a, 103b, 103c, . . . ), each for one of the warehouses, where the carrier vehicles 106 stop to load and unload their cargoes. The track 102 has switches to form double-track sections where the stations 103 are sited. This allows the carrier vehicles to run continuously but not to be interrupted by any other carrier vehicle which stops to load or unload its cargo.

In the conveyance system of Prior Art 1, the carrier vehicle having unloaded its cargo stands by at the station before it receives a command. For example, as shown in FIG. 13, the carrier vehicle 106b has unloaded its cargo for storage in the warehouse 101a 1and stands by at the station 103a before it receives another command.

If the other carrier vehicle 106a arrives for storage in or picking up from the warehouse 101a, the vehicle 106b has to be moved from the station 103a. The conveyance system of Prior Art 1 has a communication point 107a provided on the track 102 for detecting the passage of the carrier vehicle 106a and when finding that the destination of the carrier vehicle 106a is the station 103a, commanding the carrier vehicle 106b to move from the station 103a to another free station (e.g. 103b).

Another conventional conveyance system is disclosed in Japanese Patent Unexamined Publication No. Sho. 59-180610 (referred to as Prior Art 2 hereinafter) where a plurality of carrier vehicles run on a track(s) to convey cargoes. The conventional conveyance system of Prior Art 2 will be explained referring to FIG. 14.

In the conveyance system of Prior Art 2, a carrier vehicle 106 runs on a track 102 to convey cargoes between stations 103.

It is now assumed that the carrier vehicle 106 arrives at the station 103 which is busy or out of order, thus allowing no unloading. Then, the carrier vehicle passes the station and loops the track before coming back again. If the station fails to eliminate its busy or out-of-order condition by then, it forces the carrier vehicle to loop the track once more without unloading its cargo.

When such a condition remains for a considerable length of time, the carrier vehicle has to run on the track continuously and its operating efficiency declines. For compensation, the conventional conveyance system of Prior Art 2 has a transmitter 108 provided on the track 102 for supplying each carrier vehicle with a signal upon its passing by to count number of passages. When the number of passages exceeds a given number, the carrier vehicle 106 is commanded to move to and stay at an assigned station 105.

If too many carrier vehicles are on the track as compared with the number of cargoes to be conveyed, they might undesirably meet each other at the switches or stations, increasing the standby duration and interrupting the smoothness of conveying actions. Also, the carrier vehicles run without cargoes more frequently and operating efficiency declines. If the carrier vehicles are too few on the track as compared with the number of cargoes to be conveyed, waiting for the carrier vehicles will be extended, interrupting the smoothness of conveying actions.

It is therefore desired to determine the number of the carrier vehicles depending on the number of cargoes to be conveyed or the total load to be handled by the conveyance system. However, the number of cargoes is not constant but usually varied time to time. The conventional conveyance system of Prior Art 1 or 2 has a predetermined number of the carrier vehicles provided for use regardless of the total load of cargo to be conveyed and its smooth, efficient conveying action might be interrupted by an abrupt change in the load.

SUMMARY OF THE INVENTION

It is hence an object of the present invention to provide a conveyance system which can automatically control the number of carrier vehicles corresponding to a change in the load to be handled.

For achievement of the object of the present invention, the conveyance system which performs conveying action with operating a part of or all of a plurality of carrier vehicles includes a loop track, a plurality of carrier vehicles which run on the track, a station where each carrier vehicle performs loading and unloading of a cargo, and a standby station for storing the carrier vehicles at their standby state. The number of the carrier vehicles to be used is determined from a conveyance command number.

A method of controlling conveyance system according to the present invention includes the steps of: counting the number of conveying actions either in operation and to be carried out; calculating an optimum number of the carrier vehicles corresponding to the number of conveying actions; counting the number of the carrier vehicles at their in-action state; and when the number of the carrier vehicles at their in-action state is smaller than the optimum number, using some carrier vehicles at their standby state.

Another method also includes the steps of: counting the number of conveying actions either in operation and to be carried out; calculating an optimum number of the carrier vehicles corresponding to the number of conveying actions; counting the number of the carrier vehicles at their in-action state; and when the number of the carrier vehicles at their in-action state is greater than the optimum number, shifting some of the carrier vehicles from the in-action state to the standby state.

BRIEF DESCRIPTION OF THE DRAWINGS

FIG. 5 illustrates an example of a table for determining the number of carrier vehicles;

FIG. 6 illustrates an example of a table of the status of the carrier vehicles;

DETAILED DESCRIPTION

Some embodiments of the present invention will now be described referring to the accompanying drawings.

Embodiment 1

Figure 1:
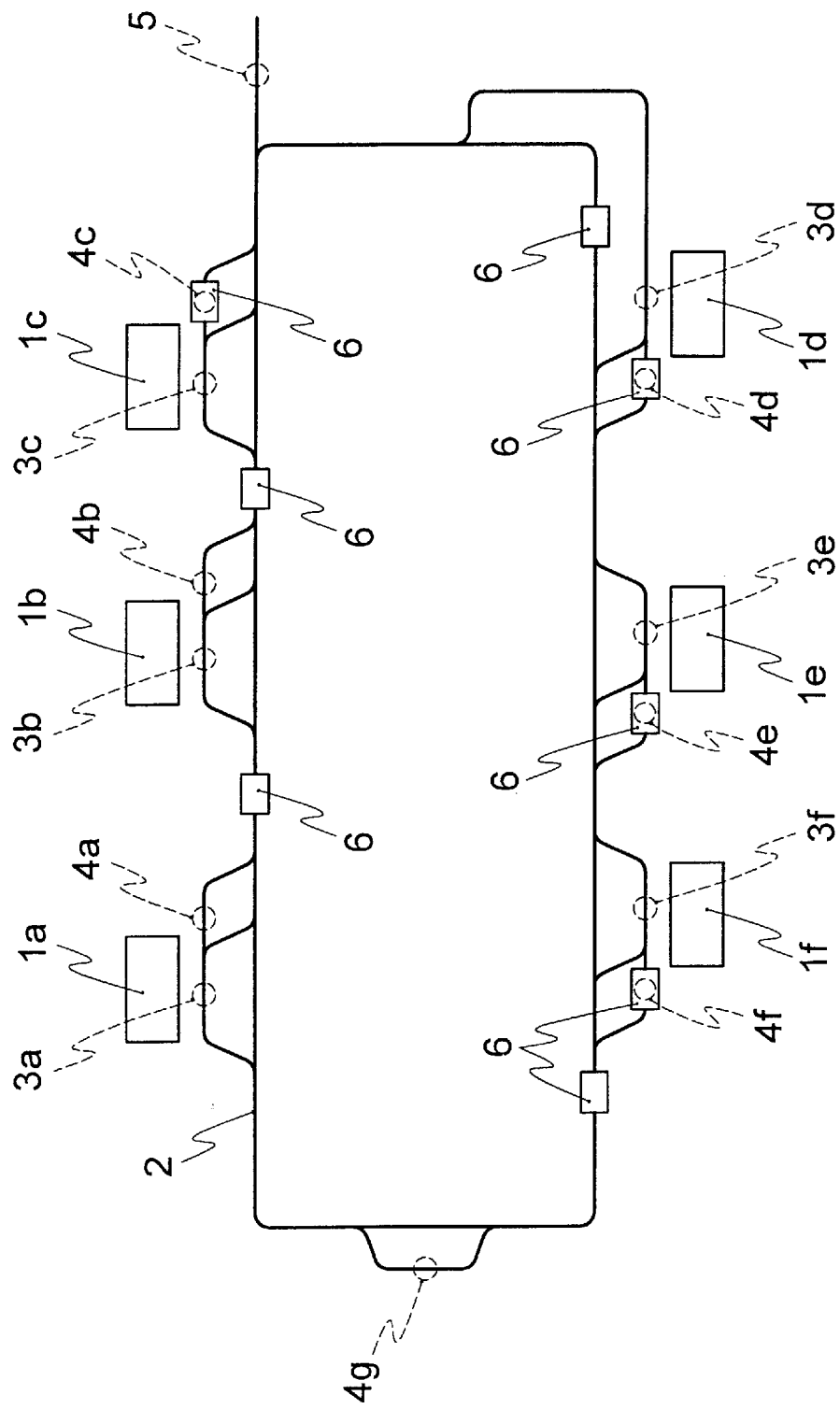
FIG. 1 is a schematic layout diagram of a conveyance system according to the present invention.

FIG. 1 illustrates a schematic layout of the conveyance system of this embodiment.

There are a plurality of warehouses (storage shelves) 1 (1a, 1b, . . . ) and a track 2 extending along the warehouses 1 in a plant. The track 2 might be designed for clockwise traveling. Carrier vehicles 6 run on the track 2 for conveying cargoes from one warehouse to another. A plurality of stations 3 (3a, 3b, . . . ) are provided each for one of the warehouses. The carrier vehicles 6 stop at the stations 3 for loading or unloading their cargoes.

In general, the track 2 has switches to form double-track sections where the stations 3 are sited. This allows the carrier vehicles not to be disturbed by any other carrier vehicle which is busy to load or unload its cargo. Each double-track section is accompanied with a standby station 4 (4a, 4b, . . . ). In case the carrier vehicles are too many as compared with the total load to be handled by the conveyance system, their extras are held at the standby stations 4. Also, a maintenance station 5 is provided on the track 2 for carrying out a maintenance action for the carrier vehicles 6.

The standby stations 4a to 4f shown in FIG. 1 share some routes with the stations 3a to 3f respectively. As a result, the carrier vehicles can be guided into the standby stations 4a to 4f via their corresponding stations 3a to 3f. Any of the carrier vehicles which needs no stopover in the standby stations 4a to 4f can be returned back directly to the track 2 from the stations 3a to 3f.

Alternatively, the standby station 4 might be provided separately, such as a standby station 4g in FIG. 1, but not shared with the station 3. Although the maintenance station 5 is located on a branch of the track 2 as shown in FIG. 1, it might be provided on the double-track section like the station 3 or the standby station 4.

Figure 2:
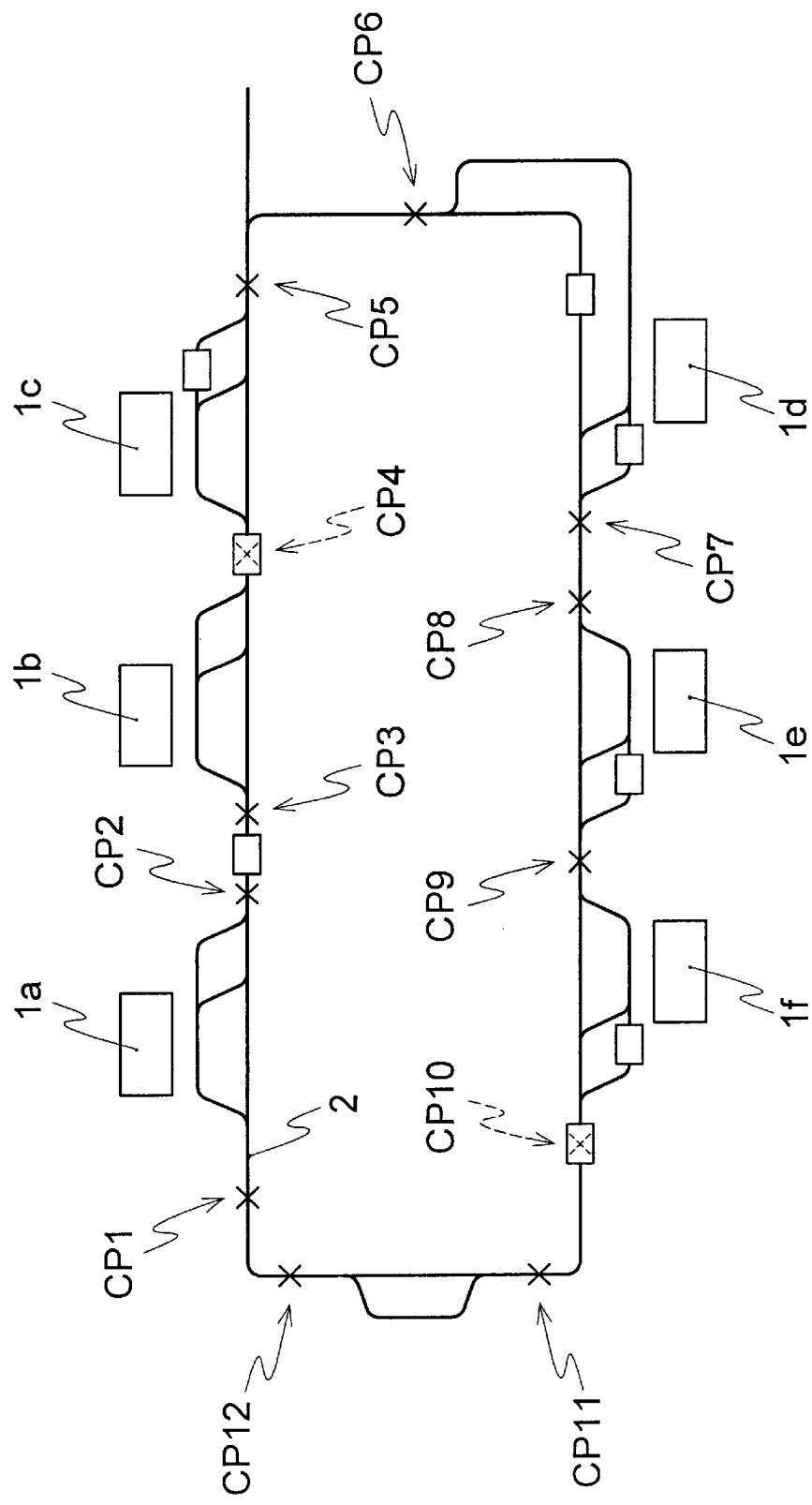
FIG. 2 is a diagram showing an arrangement of check points in the conveyance system with the layout shown in FIG. 1.

Moreover, check points (CP) are provided on the track for examining the position of the carrier vehicles and temporarily stopping the carrier vehicles. FIG. 2 illustrates an arrangement of the check points in the conveyance system shown in FIG. 1. In FIG. 2, twelve of the check points (CP1 to CP12) are arranged on the track 2. Each of the check points has a carrier passage detecting means which detects the passage or arrival of the carrier vehicle and transmits its detection signal to a conveyance controller described below. The passage detecting means might be selected from microswitches, infrared ray sensors, or magnetic sensors. It is suitable to have a transmitter provided on the carrier vehicle for transmitting a very small level of electromagnetic waves which is then received by the check points.

Figure 3:
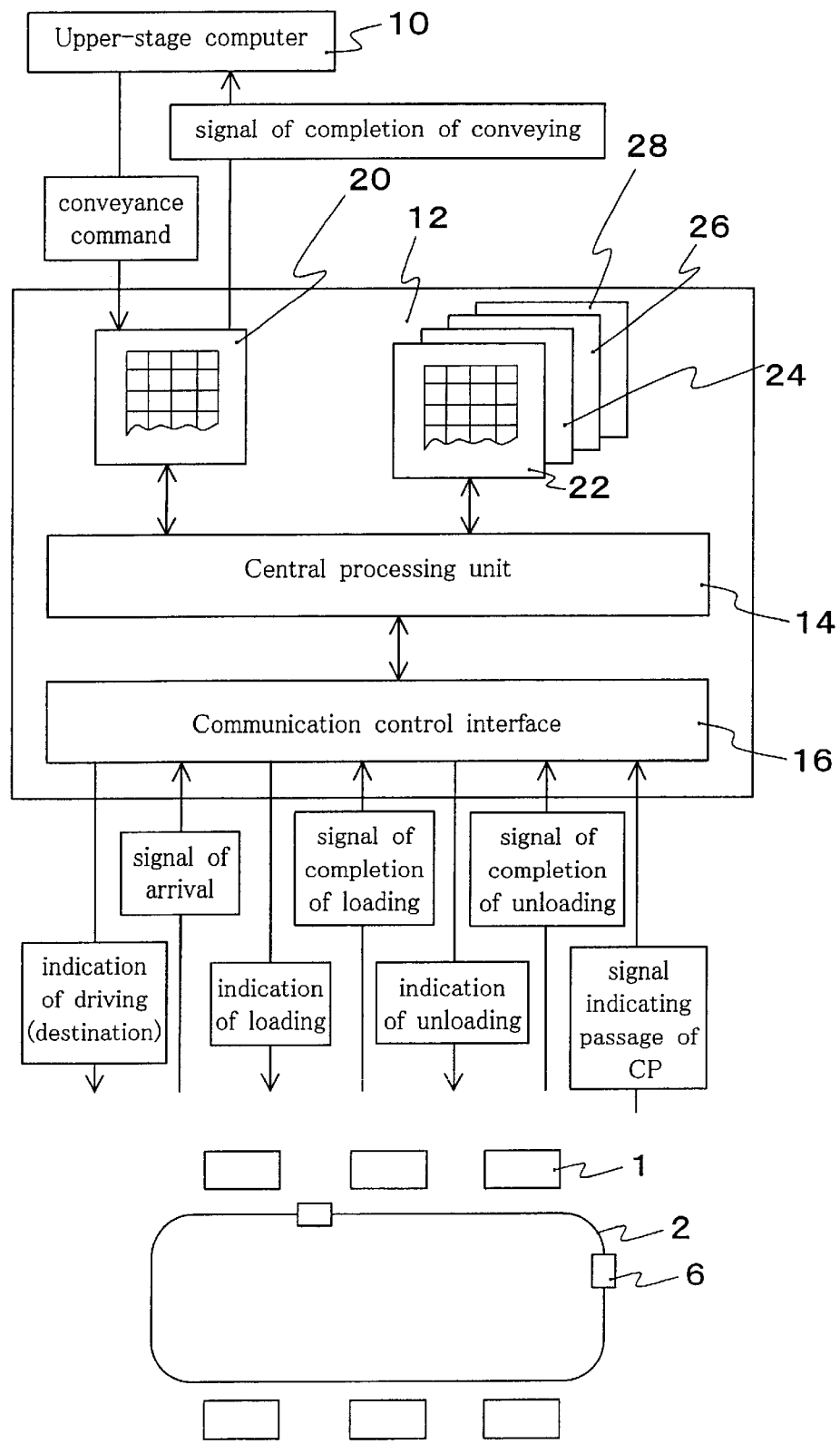
FIG. 3 is a diagram explaining the arrangement of a conveyance controller in the conveyance system of the present invention.

The conveyance controller 12 in the conveyance system of this embodiment is designed for controlling the running action of the carrier vehicles 6 and the loading/unloading action at each station 3. The conveyance controller 12 is controlled by a control device such as an upper-stage computer 10, which releases commands of the conveying actions and receives data about the actions. A schematic construction of the conveyance controller 12 is shown in FIG. 3. The conveyance controller 12 includes a central processing unit 14 and a communication control interface 16 for communication with the conveyance system as well as a group of tables 20 to 28 in which various data including the construction of the conveyance system, the current condition of conveying actions, and the status of the carrier vehicles are memorized.

The tables will now be described in more detail referring to FIGS. 4 to 8.

Figure 4:
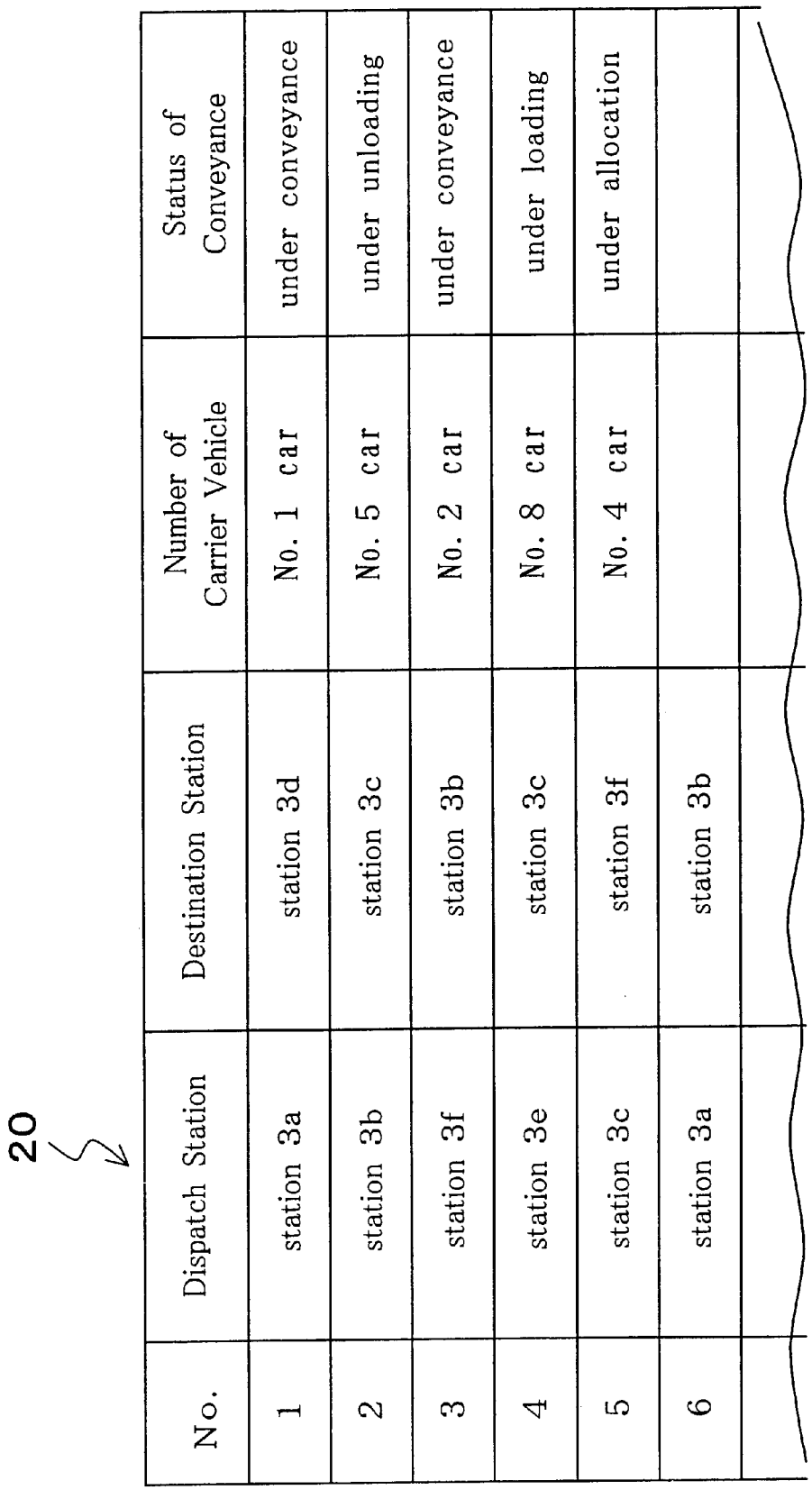
FIG. 4 illustrates an example of a table of conveyance commands.

As shown in FIG. 4, the conveyance command table 20 stores each combination of the dispatch station and the destination station for conveying a cargo, the number of the carrier vehicle to be used, and the current status of the conveying action. When a command for conveying a cargo is issued from the upper-stage computer 10 (e.g. for managing the full production lines of a plant), its start location (the dispatch station) and goal location (the destination station) are stored in the conveyance command table 20. Then, the conveyance controller 12 determines the carrier vehicle to be used and starts the conveying action. When the carrier vehicle has arrived and finished its unloading action at the destination station, the command is deleted from the conveyance command table 20. Alternatively, a flag indicating that the conveying action has been finished might be used. Accordingly, all the actions including the current conveying action and the planned actions to be conducted can be indexed by referring to the conveyance command table 20.

Referring to FIG. 5, the carrier vehicle number determining table 22 stores the optimum number $N_1$ of the carrier vehicles determined corresponding to a conveyance command number n. For example, as shown in FIG. 5, when the conveyance command number ranges from 1 to 5, seven of the carrier vehicles shall be used. Alternatively, when the conveyance command number ranges from 6 to 10, twelve of the carrier vehicles shall be used. The conveyance command number n means the total amount of load to be conveyed at the present and the future, and can be calculated from the conveyance command table 20.

Referring to FIG. 6, the carrier vehicle status table 24 stores the total mileage, the current status, and the location of each carrier vehicle. The current status is selected from three different states: "under maintenance" on the maintenance station 5, "under standby" on the standby station 4, and "in-action". Also, the "in-action" state is selected from three different types: "occupied" which is loaded with a cargo, "reserved" which is on the way to a dispatch station for receiving a cargo, and "free" which waits for another command while running on the track.

Figure 7:
FIG. 7 illustrates an example of a table of the distance between the check points.

Referring to FIG. 7, the check point (CP) distance table 26 stores the distance between two check points. When the carrier vehicle has passed or arrived at one check point, the identification number of the carrier vehicle is transmitted together with the number of the check point to the conveyance controller 12. The conveyance controller 12 updates the location of the carrier vehicle in the carrier vehicle status table 24 with the number of the check point received, calculates the distance from the current check point to the preceding check point from the CP distance table 26, and adds the distance to the mileage of the carrier vehicle in the carrier vehicle status table 24. By repeating this procedure, the location and the mileage of each carrier vehicle can be managed.

Figures 8A, 8B:
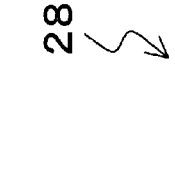
FIG. 8 illustrate an example of a table of determining the priority of the carrier vehicles.

FIG. 8 shows the carrier vehicle priority type table 28. The carrier vehicle priority type table 28 stores priority type data for selecting one of the carrier vehicles for either the standby and the action. For example, as shown in FIG. 8(b), when the priority type is "1", the minimum mileage vehicle is selected. When the priority type is "2", the maximum mileage vehicle is selected. When the priority type is "3", the carrier vehicle located nearest to the destination station is selected. FIG. 8(a) illustrates that the priority type "1" is based on the standby state while the priority type "2" is based on the in-action state. Accordingly, when the standby state is concerned, the priority is given to the minimum mileage carrier vehicle. When the in-action state is concerned, the priority is given to the maximum mileage carrier vehicle.

According to the data in the tables 20 to 28, the central processing unit 14 generates commands to the carrier vehicles 6 and the stations 3. The commands are transmitted via the communication control interface 16 to the carrier vehicles 6 and the stations 3 for determining their actions. Upon completing the commanded actions such as moving to the destination, or loading/unloading cargoes, the carrier vehicles 6 and the stations 3, 4, and 5 give signals of arrival or completion of loading/unloading to the conveyance controller 12.

Figure 9:
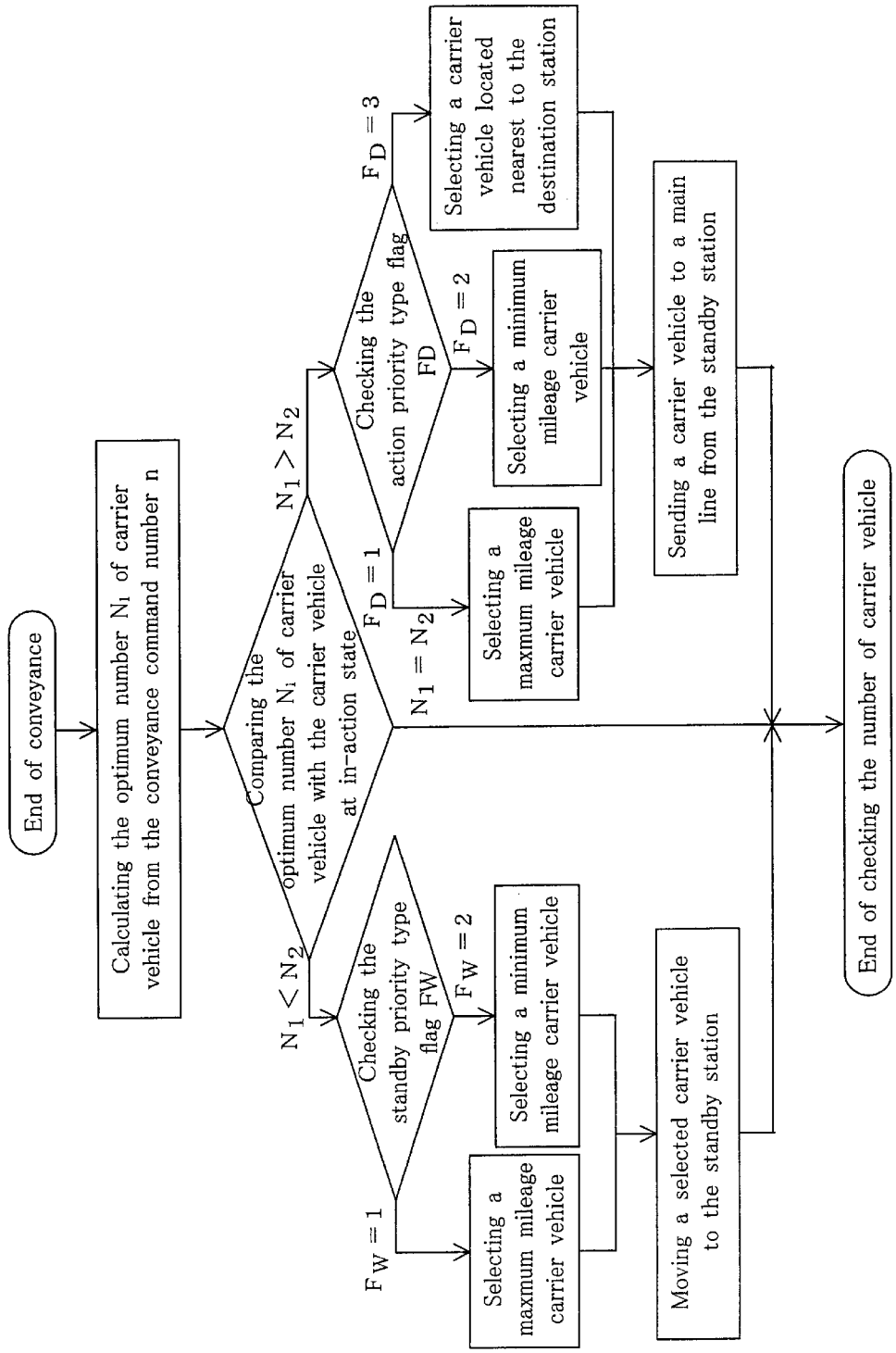
FIG. 9 is a flowchart explaining a controlling action for the number of the carrier vehicles according to the present invention.

A procedure of controlling the number of the carrier vehicles according to the present invention will now be described referring to the flowchart of FIG. 9.

The conveyance controller 12, when receiving the signal of completion of unloading from the station 3, acknowledges the end of one conveyance action. The conveyance controller 12 then deletes the command for the action from the conveyance command table 20 (or records the end of the conveyance action) and calculates the conveyance command number n at the current time.

This is followed by the conveyance controller 12 calculating the optimum number $N_1$ of the carrier vehicles to be used from the conveyance command number n determined with the carrier vehicle number determining table 22, and then the number $N_2$ of the carrier vehicles in their "in-action" state.

When the number $N_2$ is greater than the optimum number $N_1$ ($N_2>N_1$), the carrier vehicles in action are too many for handling the load in the conveyance system. Then, some of the carrier vehicles have to be driven back to the standby stations for standby actions. The conveyance controller 12 accesses the carrier vehicle priority table 28 to examine the standby priority type flag $F_w$. When the standby priority type flag $F_w$ is 1, the conveyance controller 12 selects from the carrier vehicle status table 24 one of the carrier vehicles which is free and has the minimum mileage and commands it to move to the standby station. When the standby priority type flag $F_w$ is 2, the conveyance controller 12 selects and commands one of the carrier vehicles, which is free and has the maximum mileage, to move to the standby station.

While the carrier vehicle to be held at its standby state is selected from free carrier vehicles in this example, it might be selected from all the carrier vehicles on the system including the in-action and reserved vehicles in the case of absence of free vehicles. In the latter case, the in-action and reserved carrier vehicles can be driven to the standby stations whenever finishing the current conveying action or the conveying action to be conducted.

When the number $N_2$ is smaller than the optimum number $N_1$ ($N_2<N_1$), the carrier vehicles in action are too few for handling the load in the conveyance system. Then, some of the carrier vehicles have to be released out from the standby stations for conveying actions. The conveyance controller 12 accesses the carrier vehicle priority table 28 to examine the in-action priority type flag $F_D$. When the in-action priority type flag $F_D$ is 1, the conveyance controller 12 selects from the carrier vehicle status table 24 one of the carrier vehicles which is at the standby state and has the minimum mileage and commands it to start its conveying action. When the in-action priority type flag $F_D$ is 2, the conveyance controller 12 selects and commands one of the carrier vehicles, which is at the standby state and has the maximum mileage, to start its conveying action. Alternatively, when the in-action priority type flag $F_D$ is 3, the conveyance controller 12 accesses the conveyance command table 20 to retrieve a command which is not yet assigned with the carrier vehicle and determine its destination station. The conveyance controller 12 then selects from the carrier vehicle status table 24 one of the carrier vehicles, which is located nearest to the destination station, to start its conveying action.

When the number $N_2$ is equal to the optimum number $N_1$ ($N_2=N_1$), the number of the carrier vehicles is proper for conveying the load in the system and no more action for controlling the number of the carrier vehicles will be needed.

As described, this embodiment of the present invention allows the number of carrier vehicles to be automatically determined according to the conveyance command number, i.e. the number of cargoes to be conveyed. Accordingly, even if the load to be handled by the conveyance system is not uniform but varied, the conveying action can be carried out promptly and efficiently.

Also, since each of the stations for loading and unloading cargoes is accompanied with the standby station for standby actions, the carrier vehicle which has just finished its unloading action can readily be held at its standby state.

Moreover, either the carrier vehicles to be used or the carrier vehicles to be held at their standby state can be determined depending on their mileage. As a result, the timing of maintenance of the carrier vehicles can be optimized by modifying their mileage. For example, the maintenance can be performed at the same timing by making the mileage uniform. In reverse, the timing of maintenance might be set different among the carrier vehicles for avoiding their maintenance actions from being conducted at once.

Embodiment 2

In Embodiment 1 of the present invention, the conveyance command number is calculated at the end of every conveying action and utilized to determine the number of the carrier vehicles to be used.

It is however possible to predetermine the number of the carrier vehicles to be used whenever the upper-stage computer 10 releases a command for the conveying action.

When the command for the conveying action is released from the upper-stage computer 10, its start (the dispatch station) and goal (the destination station) are saved in the conveyance command table 20. The conveyance controller 12 accesses the conveyance command table 20 to determine the conveyance command number n at the current time. As described, the conveyance command number n is the number of conveyance command recorded in the conveyance command table 20.

Then, the conveyance controller 12 calculates the optimum number $N_1$ of the carrier vehicles from the carrier vehicle number determining table 22 and determines the number $N_2$ of the carrier vehicles in their in-action state from the carrier vehicle status table 24.

When the number $N_2$ is greater than the optimum number $N_1$ ($N_2>N_1$), some of the carrier vehicles at their in-action state are driven to the standby stations. As described, the carrier vehicles to be driven to the standby stations are selectively determined on the basis of the standby priority flag $F_W$ of the carrier vehicle priority table 28. When the number $N_2$ is smaller than the optimum number $N_1$ ($N_2<N_1$), some of the carrier vehicles at their standby state are released out from the standby stations. Similarly, the carrier vehicles to be released are selectively determined on the basis of the in-action priority type flag $F_D$ of the carrier vehicle priority table 28. When the number N2 is equal to the optimum number N1 (N2=N1), no action for controlling the number of the carrier vehicles will be needed.

As described, this embodiment in which the number of carrier vehicles is adjusted when the command for conveyance is given, like Embodiment 1 for controlling the number of carrier vehicles at the end of each conveying action, can also determine the number of the carrier vehicles to be used on the basis of the conveyance command number, i.e. the number of cargoes to be conveyed.

Of course, the number of carrier vehicles can controllably be determined at both the timing of the end of every conveying action and the timing of release of another command for conveying. A difference between the optimum number $N_1$ of carrier vehicles and the number $N_2$ of carrier vehicles at their in-action state is caused by a change in the conveyance command number n, i.e. due to the end of the conveying action (as n being decreased) or the release of another command for conveying (as n being increased). Accordingly, if the number of the carrier vehicles is controllably determined at both the timing of the end of every conveying action and the timing of release of another command for conveying, it is possible to readily correspond to a change in the amount of load to be conveyed, thereby adjusting the number of carrier vehicles.

Embodiment 3

The conveyance controller 12 which receives a command for conveying from the upper-stage computer 10 selects and directs the carrier vehicle for performing the conveyance to move to the dispatch station. According to the previous embodiments, the carrier vehicle is selected from the carrier vehicle at their in-action state. Thus, even if one carrier vehicle at its standby state is available near the dispatch station, it will not be selected. As a result, the carrier vehicle selected has to be driven from its current far location to the dispatch station thus creating an idle time and declining the smoothness of its conveying action.

This embodiment selects the optimum carrier vehicle from the carrier vehicles at both the in-action and standby states, i.e. all the carrier vehicle excluding those under the maintenance condition.

As described, when a command for conveying is issued from the upper-stage computer 10, its dispatch station and destination station are firstly saved in the conveyance command table 20. The conveyance controller 12 accesses the carrier vehicle status table 24 to select the carrier vehicle to be used. While the carrier vehicle status table 24 has data about the current location of the carrier vehicles determined from signals of the stations and the check points, the conveyance controller 12 selects one of which the current location is nearest to the dispatch station from the carrier vehicles in-action state and standby state. The carrier vehicle selected moves to the dispatch station for loading with a cargo and then runs to the destination station for delivery.

The present embodiment allows the carrier vehicles at their standby state to be candidates for selection of the carrier vehicle to be used for the conveying action. Since any carrier vehicle which is nearest to the dispatch station is used, the idle time can be decreased and the waste running can be minimized.

When the carrier vehicle at its standby state is selected, the number of the carrier vehicles at their in-action state is increased and might be too large for the load in the conveyance system. This can be overcome by controlling the number of the carrier vehicles at the end of every conveying action as described in Embodiment 1.

Embodiment 4

Figure 10:
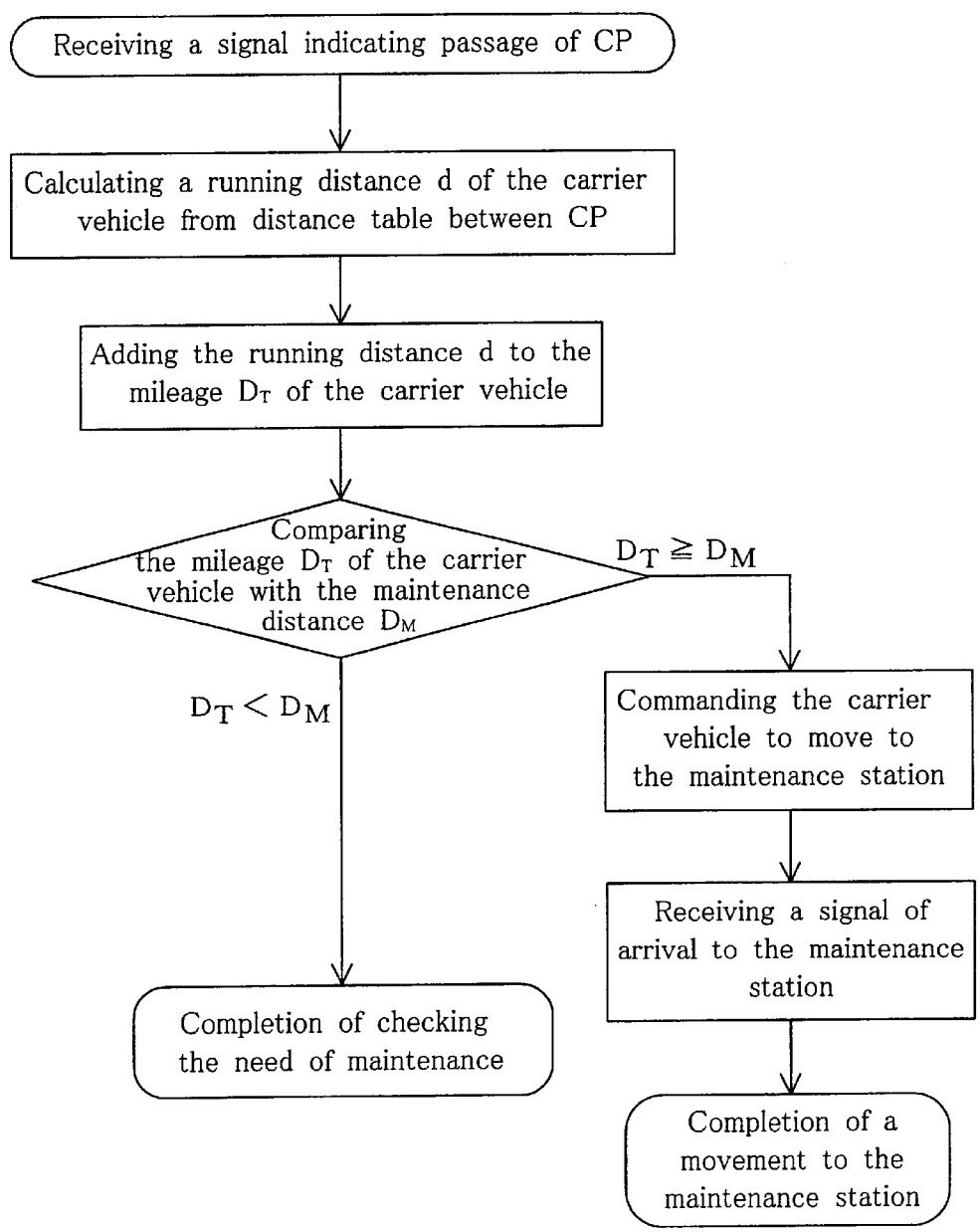
FIG. 10 is a flowchart explaining a maintenance action for the carrier vehicle according to the present invention.

This embodiment will be described referring to the flow-chart of FIG. 10.

As described previously, the conveyance system of the present invention saves the mileage of each carrier vehicle in the carrier vehicle status table 24. When the interval of maintenance actions is recorded in the carrier vehicle status table 24 and used for comparison with a mileage of the carrier vehicle to determine whether the maintenance action is needed or not, each carrier vehicle can automatically be driven to the maintenance station upon finding that its maintenance action is needed.

The signal indicating the passage of the carrier vehicle is transmitted from each check point to the conveyance controller 12. Upon receiving the signal, the conveyance controller 12 accesses the CP distance table 26 to determine the distance d between the current check point and the preceding check point where the carrier vehicle has been traveled. Then, the distance d is added to the mileage $D_T$ of the carrier vehicle saved in the carrier vehicle status table 24 by the conveyance controller 12.

The resultant sum of the mileage $D_T$ is compared with the maintenance distance $D_M$. When its mileage $D_T$ is not smaller than the maintenance distance $D_M$ ($D_T \geq D_M$), the carrier vehicle is commanded to move to the maintenance station 5 by the conveyance controller 12. When the carrier vehicle arrives the maintenance station 5, a signal indicative of the arrival is released from either the carrier vehicle itself or the maintenance station 5. Upon receiving the arrival signal, the conveyance controller 12 notifies the upper-stage computer 10 of the arrival of the carrier vehicle at the maintenance station 5.

This embodiment allows any carrier vehicle which has run a predetermined length of distance to be automatically driven to the maintenance station 5 for the maintenance action.

Although the interval of maintenance actions shown in the carrier vehicle status table of FIG. 6 is uniform, it might be set different between the carrier vehicles depending on the type, the age, and the history of faults.

Embodiment 5

Figure 11:
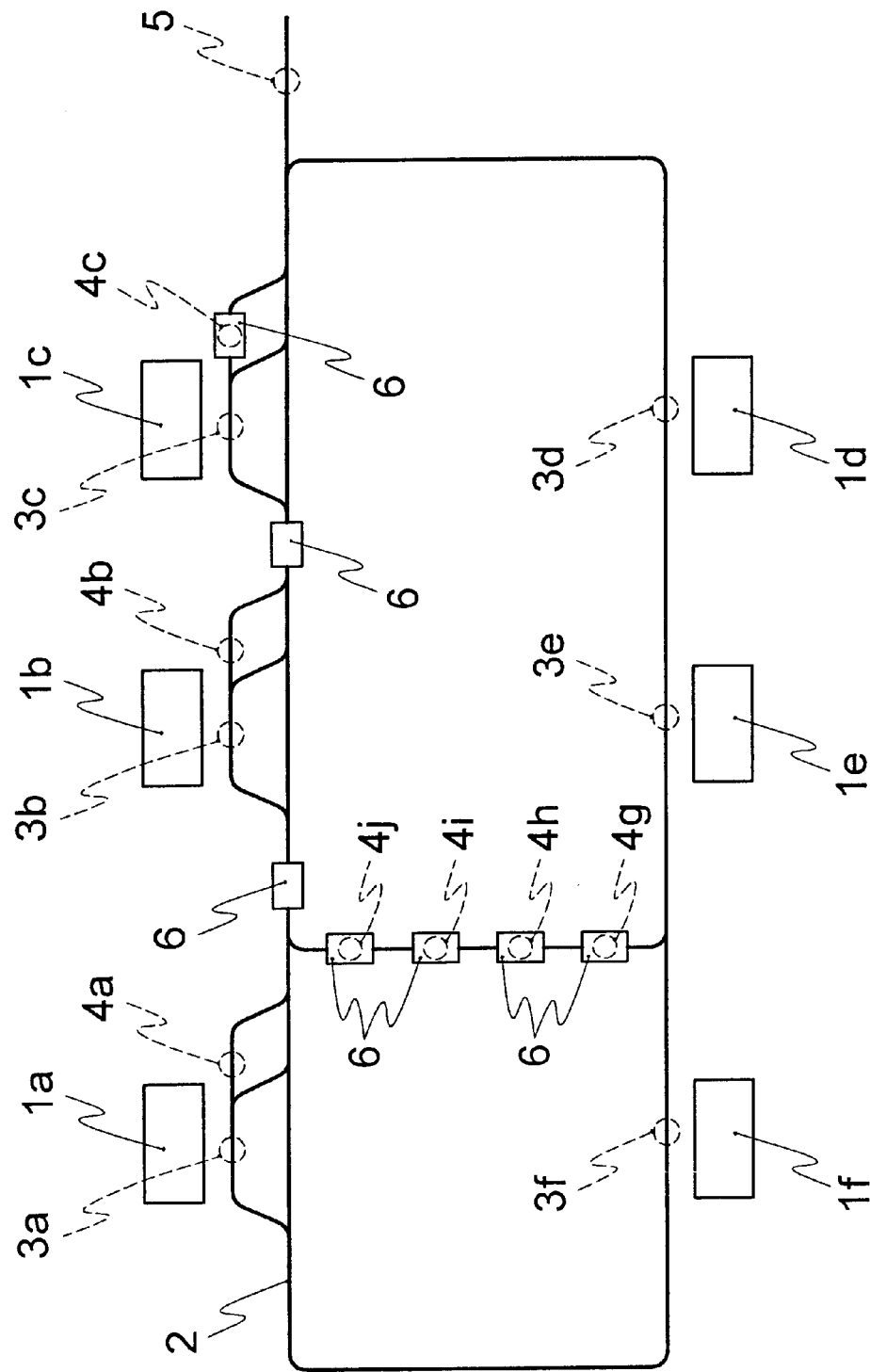
FIG. 11 is a schematic layout diagram of a conveyance system according to the present invention.

According to the previous embodiments, the track has double-track sections where the stations 3 for loading and unloading of cargoes and the standby stations 4 for the standby action are provided. However, the conveyance method of the present invention is applicable to a modification where the stations 3 (3d, 3e, and 3f) are directly provided across the main line of the track 2 as shown in FIG. 11. Also, the conveyance method of the present invention is applicable to another modification where the standby stations 4 (4g, 4h, 4i, and 4j) are provided on bypasses of the track 2.

Figure 12:
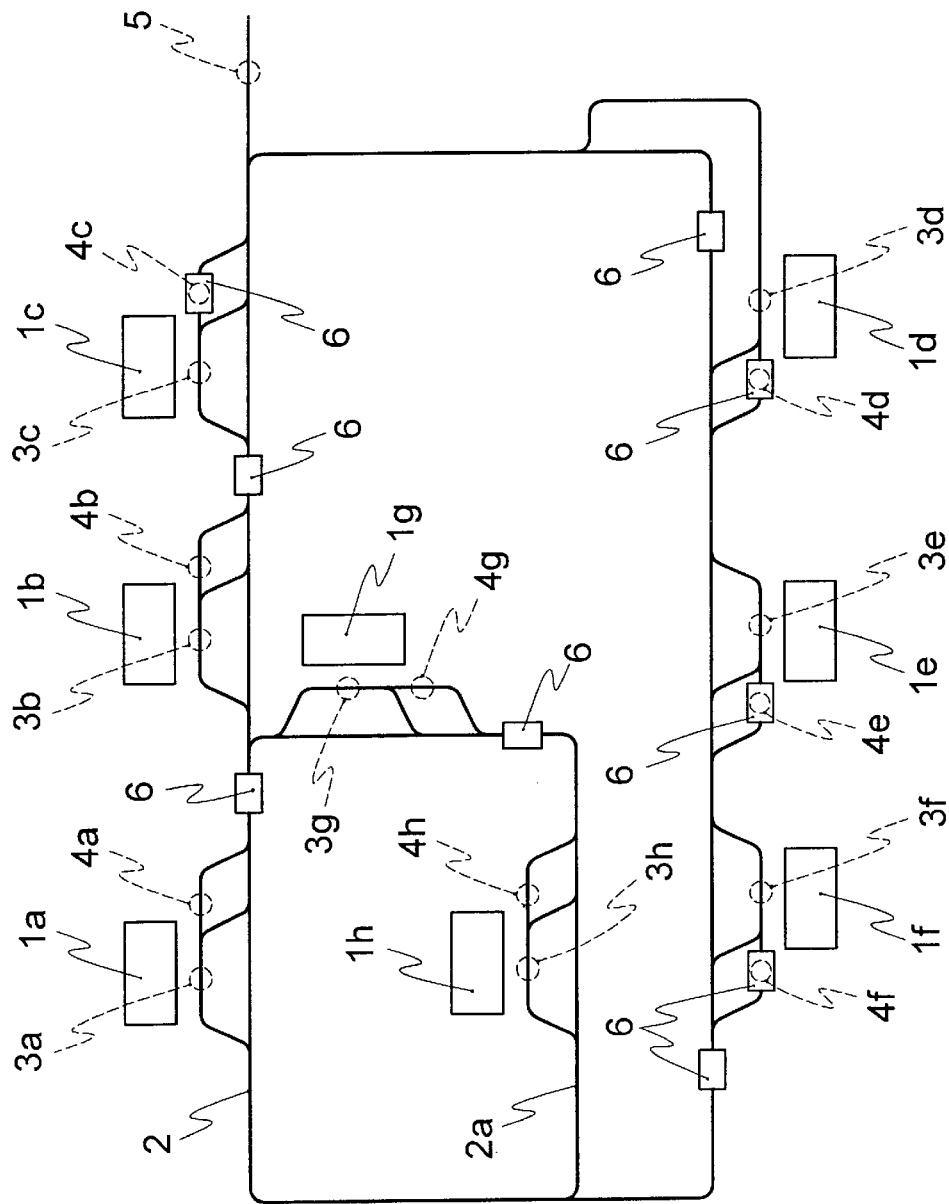
FIG. 12 is a schematic layout diagram of a conveyance system according to the present invention.
Figure 13:
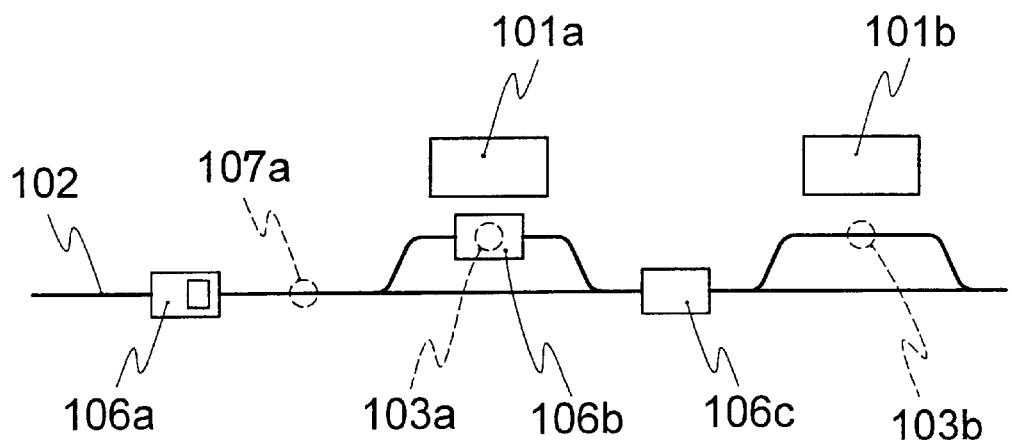
FIG. 13 is a diagram showing a conventional conveyance system of Prior Art 1.
Figure 14:
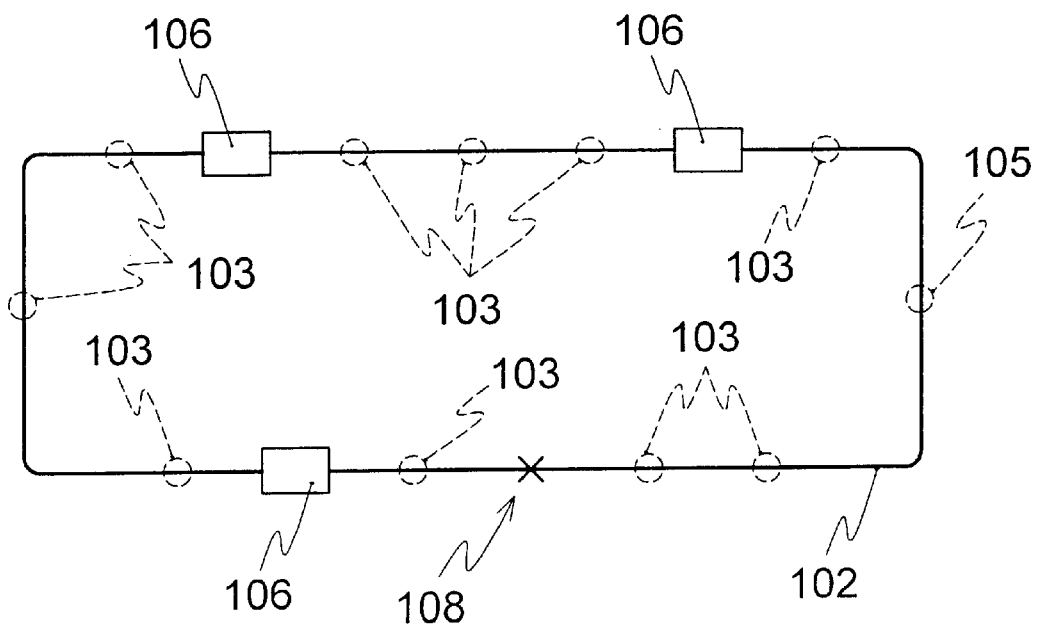
FIG. 14 is a diagram showing a conventional conveyance system of Prior Art 2.

Moreover, the conveyance method of the present invention is applicable to a further modification where two or more tracks 2 and 2a are provided as they share a common section, as shown in FIG. 12. The number of carrier vehicles can be controlled while the tracks are treated as either different systems or a single system.

As set forth above, the present invention allows the number of the carrier vehicles to be automatically determined corresponding to the quantity of load in the conveyance system. Accordingly, even if the load is not uniform but significantly varied, the conveying action can be conducted readily and efficiently. Also, since waste running of carrier vehicles is minimized, the conveyance system can favorably be implemented while increasing the operational life and minimizing the energy consumption.

The present invention also allows the carrier vehicle to be selected from all the available carrier vehicles including one at their standby state and quickly forwarded to the dispatch warehouse (station) thus minimizing the standby time and increasing the speed of the conveying action. Also, since the mileage of each carrier vehicle is minimized, the conveyance system can be improved in both the energy saving and the operational life In addition, since the mileage of each carrier vehicle is acknowledge, it can be used for determining the timing of maintenance and automatically driving the carrier vehicle to the maintenance station.

Since the carrier vehicle are classified by mileage into those at their in-action state and those at their standby state, their mileage levels can be average for making their maintenance actions be conducted at once. In reverse, particular carrier vehicles can be given priority for the maintenance, so that the carrier vehicles are varied in the timing for maintenance action to avoid their maintenance actions be conducted at once.

What is claimed is:

1. A conveyance system which performs conveying action by operating at least some of a plurality of carrier vehicles, comprising a loop track, a plurality of carrier vehicles which run on the track, a station where each carrier vehicle loads and unloads cargo, a standby station for storing the carrier vehicles in a standby state, and a conveyance controller issuing conveyance commands to the carrier vehicles, wherein quantity of the carrier vehicles used in response to the conveyance commands is determined from quantity of the conveyance commands being simultaneously executed.

2. The conveyance system of claim 1, wherein the system further includes a conveyance command table for storing conveying action command data about dispatch stations and destination stations, a carrier vehicle number determining table for storing an optimum number of the carrier vehicles with each conveyance command number, and a carrier vehicle status table for storing data as to whether the carrier vehicles are in an in-action state or a standby state, wherein the optimum number of the carrier vehicles is determined from the conveyance command number of the conveyance command table and the carrier vehicles in an in-action state can be shifted to the standby state or the carrier vehicles in the standby state can be shifted to the in-action state so that the optimum number is equal to current number of the carrier vehicles in the in-action state.

3. The conveyance system of claim 1, wherein the system further includes a conveyance command table for storing conveying action command data about dispatch stations and destination stations, and a carrier vehicle status table for storing data about current location of each carrier vehicle, wherein one of the carrier vehicles located nearest to the dispatch station is assigned with a conveyance command.

4. The conveyance system of claim 3, wherein the system further includes passage detecting means provided on the track for detecting passage of each carrier vehicle, and wherein the current location of each carrier vehicle is identified by a signal received from the passage detecting means.

5. The conveyance system of claim 1, wherein the system further includes a maintenance station for carrying out a maintenance action on the carrier vehicles and a carrier vehicle status table for storing data about mileage of each carrier vehicle, wherein, when the mileage for a carrier vehicle exceeds a predetermined interval between two maintenance actions, the carrier vehicle is commanded to move to the maintenance station.

6. The conveyance system of claim 5, wherein the system further includes passage detecting means for detecting passage of the carrier vehicle through each of a plurality of check points and a check point distance table for storing distance between the passage detecting means, wherein the distance between a passage detecting means and a preceding passage detecting means is summed with the mileage of the carrier vehicle.

* * * * *